(12) United States Patent
Davies et al.

(10) Patent No.: US 7,499,400 B2
(45) Date of Patent: Mar. 3, 2009

(54) INFORMATION FLOW CONTROL IN A PACKET NETWORK BASED ON VARIABLE CONCEPTUAL PACKET LENGTHS

(75) Inventors: Neil James Davies, Bristol (GB); Peter William Thompson, Bristol (GB); Judith Yvonne Holyer, Bristol (GB); Christopher James Vowden, Bristol (GB); Laura Anne Lafave, Bristol (GB); Graham Willmott, Bristol (GB)

(73) Assignee: U4EA Technologies Limited, London (GB)

( * ) Notice: Subject to any disclaimer, the term of this patent is extended or adjusted under 35 U.S.C. 154(b) by 1143 days.

(21) Appl. No.: 10/406,623

(22) Filed: Apr. 3, 2003

(65) Prior Publication Data

US 2004/0196791 A1 Oct. 7, 2004
US 2008/0165689 A9 Jul. 10, 2008

Related U.S. Application Data

(63) Continuation of application No. PCT/GB00/03789, filed on Oct. 3, 2000, now abandoned.

(51) Int. Cl.
*H04J 1/16* (2006.01)
*H04L 12/28* (2006.01)

(52) U.S. Cl. .................. 370/235; 370/412; 370/470

(58) Field of Classification Search ............. 370/229, 370/230, 230.1, 235, 235.1, 236, 412, 470
See application file for complete search history.

(56) References Cited

U.S. PATENT DOCUMENTS

| | | | | |
|---|---|---|---|---|
| 4,771,391 A | * | 9/1988 | Blasbalg ................... 709/232 |
| 5,233,606 A | * | 8/1993 | Pashan et al. ............... 370/418 |
| 5,434,848 A | * | 7/1995 | Chimento et al. .......... 370/232 |
| 5,602,845 A | | 2/1997 | Wahl |
| 5,982,778 A | * | 11/1999 | Mangin et al. .............. 370/445 |
| 5,991,226 A | * | 11/1999 | Bhullar .................. 365/230.08 |
| 6,003,089 A | * | 12/1999 | Shaffer et al. .............. 709/233 |
| 6,064,678 A | * | 5/2000 | Sindhushayana et al. .... 370/470 |
| 6,920,109 B2 | * | 7/2005 | Yazaki et al. ............. 370/230.1 |
| 2003/0147349 A1 | * | 8/2003 | Burns ....................... 370/230.1 |
| 2003/0218979 A1 | * | 11/2003 | Storry et al. ................ 370/230 |
| 2004/0032830 A1 | * | 2/2004 | Bly et al. .................... 370/235 |
| 2004/0148391 A1 | * | 7/2004 | Lake et al. .................. 709/224 |

(Continued)

FOREIGN PATENT DOCUMENTS

EP 0254047 A2 1/1988

(Continued)

OTHER PUBLICATIONS

Chao, et al.; Queue-Management with Multiple Delay and Loss Priorities for ATM Switches; May 1, 1994; pp. 1184-1189; Polytechnic University and Bellcore.

(Continued)

*Primary Examiner*—Andrew Lee

(57) ABSTRACT

There is disclosed a method and controller for controlling an information flow in a data transmission system including receiving a plurality of data packets having a received packet length and at a received sample rate. The method and controller also includes determining a configured packet length for each data packet based on a configured service rate for each data packet. The method and controller may also include scheduling each data packet in accordance with a respective configured packet length.

20 Claims, 5 Drawing Sheets

U.S. PATENT DOCUMENTS

| | | | |
|---|---|---|---|
| 2005/0163049 A1* | 7/2005 | Yazaki et al. | 370/230 |
| 2005/0254423 A1* | 11/2005 | Berghoff | 370/230.1 |
| 2006/0109794 A1* | 5/2006 | Muszynski et al. | 370/251 |
| 2006/0268719 A1* | 11/2006 | Takase et al. | 370/235.1 |

FOREIGN PATENT DOCUMENTS

| | | |
|---|---|---|
| EP | 0526104 A2 | 3/1993 |
| EP | 0669777 A1 | 8/1995 |
| JP | 2000252999 A * | 9/2000 |
| JP | 200003252999 | 9/2000 |

OTHER PUBLICATIONS

Kim, et al.; The FB-RED Algorithm for TCP over ATM; Nov. 8, 1998; pp. 551-555; Lucent Technologies, Murray Hill, NJ; School of Electrical Engineering, Seoul National University, Seoul, Korea.

Badran, et al.; ATM Switch Architectures with Input-Output-Buffering: Effect of Input Traffic Correlation, Contention Resolution Policies, Buffer Allocation Strategies and Delay in Backpressure Signal; May 26, 1994; pp. 1187-1213; 8213 Computer Networks and ISND Systems, Amsterdam, NL.

Choudhury, et al.; Space Priority Management in a Shared Memory ATM Switch; Nov. 29, 1993; pp. 1375-1383; AT&T Bell Laboratories; Murray Hill, NJ.

Boyer, et al.; Diversification and Integration of Networks and Switching Technologies Towards the 21st Century; Oct. 25-30, 1992; pp. 316-320; International Switching Symposium; Yokohama, Japan.

Chao, et al.; A VLSI Sequencer Chip for ATM Traffic Shaper and Queue Manager; Jun. 12, 1992; pp. 1276-1281; Orlando Globecom '92 Conference, Orlando, Florida.

Bianchi, et al; Effects of Multiple Node Crossings on ATM Traffic Performance; Jan. 1999; pp. 5-12; Milano, Italy.

Petr, et al.; Nested Threshold Cell Discarding for ATM Overload Control: Optimization Under Cell Loss Constraints; Aug. 19, 1991; pp. 1403-1412; Tenth Annual Joint Conference of the IEEE Computer and Communications Societies; Bal Harbour, FL.

Wu, et al.; GCRA-Based Architecture of Multi-Connection Shaper and Enforcer in Multi-Service ATM Networks; Aug. 2, 1996; pp. 681-693; Computer Communications.

* cited by examiner

THE ARBITARY LOSS PROBABILITIES AND THE SERVICE RATES
ASSIGNED TO THE STATES OF THE SHAPER / POLICER QUEUE

THE CLASSIFICATION PROBABILITIES ASSOCIATED WITH
EACH STATE OF THE QUEUE

INFORMATION FLOW CONTROL IN A PACKET NETWORK BASED ON VARIABLE CONCEPTUAL PACKET LENGTHS

CROSS-REFERENCE TO FOREIGN APPLICATION

This application is a continuation of International Application No. PCT/GB00/03789, with an international filing date of Oct. 3, 2000, now abandoned, entitled "INFORMATION FLOW CONTROL IN A PACKET NETWORK BASED ON VARIABLE CONCEPTUAL PACKET LENGTHS," which was published in English under International Publication Number WO 02/30064 on Apr. 11, 2002 and is incorporated herein by reference in its entirety.

CROSS-REFERENCE TO RELATED APPLICATIONS

| Serial No. | Title | Inventor(s) | Filing Date |
| --- | --- | --- | --- |
| 10/407,910 | ALLOCATING PRIORITY LEVELS IN A DATA FLOW | Davies, et al. | Apr. 3, 2000 |
| 10/406,143 | DATA FLOW CONTROL | Davies, et al. | Apr. 3, 2000 |
| 10/406,144 | PACKET SEQUENCE CONTROL | Davies, et al. | Apr. 3, 2000 |
| 10/406,149 | FILTERING DATA FLOWS | Davies, et al. | Apr. 3, 2000 |
| 10/407,814 | PRIORITIZING DATA WITH FLOW CONTROL | Davies, et al. | Apr. 3, 2000 |
| 10/406,145 | POLICING DATA BASED ON DATA LOAD PROFILE | Davies, et al. | Apr. 3, 2000 |

The above-listed non-provisional applications are commonly assigned with the present invention and are incorporated herein by reference in their entirety.

TECHNICAL FIELD OF THE INVENTION

The present invention is directed, in general, to transmission of digital packets in telecommunications systems and, more specifically, to contention management within and between streams of packets in store and forward networks.

BACKGROUND OF THE INVENTION

There exist many techniques for controlling digital packet information flows. Some such techniques involve providing a certain quality of service for different types of traffic. There are a number of general requirements associated with ensuring quality of service levels. Where quality differentiation is provided for more than one data stream, it is preferable to ensure that different quality requirements for the various data streams of packets are individually and collectively met within the constraint of the finite quality available. In order to provide differential levels of loss and delay as well as throughput, the quantity of input data and its temporal pattern should be constrained. The quantity of input data serviced, i.e. the throughput of data, is known as long term management. Controlling the temporal pattern of data is known as short term management. The traffic in particular data streams also should be protected from the consequential effects of burstiness in other data streams. For example, individual data streams of traffic should be protected from the effects of protocols such as Transmission Control Protocol (TCP), which is designed to use as much bandwidth as possible without regard to other data streams, and from malicious intentions or errors in the end devices of a network. It is also preferable to manage the interleaving of individual data streams within the constraints of the available resources.

The management of quality of service is particularly difficult at the periphery or edge of the network, as the devices are not under the control of the central administrator of the network. The behaviour of these devices, therefore, cannot be assumed or predicted. The ever-increasing diversity in applications, traffic, and convergence also complicates the management of quality of service. Different traffic has different quality of service requirements, and the consequences of delay and/or loss differs for different traffic according to the interpretation associated with an application.

The possibility of replicating network devices to enable traffic with different quality requirements to be physically separated and processed separately is impractical, as the implementation of network devices is expensive. For this reason, it is desirable to manage quality of service of different traffic using a single network device.

There is currently a trend towards forming traffic patterns as constant bit rate patterns, with the aim of increasing predictability. This is deterministic control which focuses on improving the loss characteristics and efficiency of the network. However, such techniques have the disadvantage that quality assurance in the presence of "over-booking" often requires total global knowledge of the behavior of the sources in the network such as on/off times, relative phase, and the effects of past history on the state of the network.

The arrival of the data streams of packets from different sources, therefore, is inherently difficult to control due to, for example, the on/off times and the relative phase. Under certain conditions, such properties manifest themselves by delivering extremely unfair service to some or all of the data streams. Co-pending U.S. patent application Ser. No. 10/406,143 (U4EA-0002) entitled "DATA FLOW CONTROL" discloses a technique in which the competition for resources may become a more predictable process by introducing gaps between packets which decohere the data streams. In assigning variable gaps between packets and data streams to address this issue, care should be taken to ensure that sizes of re-occurring patents of packets cause mutual interference between the data streams.

Accordingly, what is needed in the art is an improved technique for controlling information flow in a data transmission system, which enables the control of the quality of service requirements for different types of traffic to be improved.

SUMMARY OF THE INVENTION

To address the above-discussed deficiencies of the prior art, the present invention provides a method of controlling an information flow in a data transmission system including receiving a plurality of data packets having a received packet length and at a received sample rate. The method also includes determining a configured packet length for each data packet based on a configured service rate for each data packet. Assigning a conceptual packet length to a data packet to assist in processing the data packets addresses the limitations as described above.

The method may also include scheduling each data packet in accordance with a respective configured packet length. The configured packet length may be shorter or longer than the received packet length. The method may further include generating a modified information flow by providing a variable spacing between the data packets.

The present invention further provides a controller for controlling an information flow in a data transmission system including an input means (e.g., an input interface) for receiving a plurality of data packets having a received packet length and at a received sample rate. The controller also includes a means for determining a configured packet length for each data packet based on a configured service rate for each data packet, and an output means (e.g., an output interface) for outputting the data packet at the configured service rate. The means for determining a configured packet length may be embodied at least in part in a policer/shaper.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
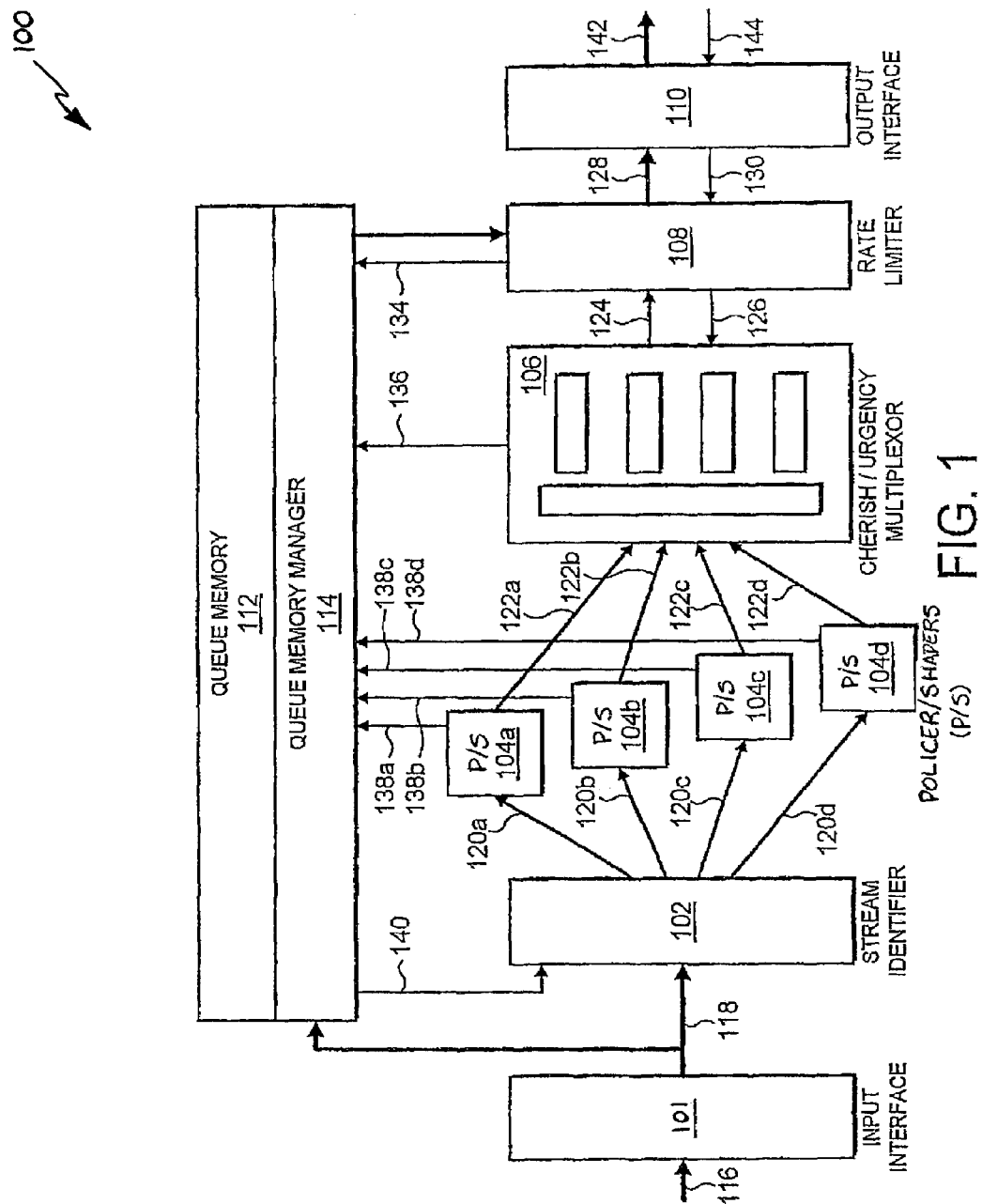
FIG. 1 illustrates a block diagram of an architecture of a multiplexer constructed in accordance with the principles of the invention.

Referring initially to FIG. 1, illustrated is a block diagram of an embodiment of an architecture of a multiplexor or controller, generally designated 100, constructed in accordance with the principles of the present invention. It should be noted that the application of the present invention is not limited to the specific architecture shown in FIG. 1 and from reading the following description one skilled in the art will appreciate the general applicability of the present invention. The multiplexor 100 multiplexes streams of data in a packet-based network as will be described in further detail hereinbelow.

The multiplexor 100, includes an input interface 101, a stream identifier 102, a plurality of policer/shapers 104a, 104b, 104c, 104d, which are collectively referred to as policer/shapers 104, a cherish/urgency multiplexor 106, a rate limiter 108, an output interface 110, a queue memory 112, and a queue memory manager 114.

The multiplexor 100 receives an information flow as an input on line 116. The information flow may include packets which may be associated with various different types of data traffic. For example, the packets may be received in parallel or in series. The input on the line 116 may receive parallel information flows. For the purposes of the described example, the information flow, or data stream, may include a Voice over Internet Protocol (VoIP) stream, a block data transfer stream, and a telnet traffic stream.

The input interface 101 provides the basic functionality necessary to receive transmitted data packets from an external system or device via a transmission medium. The input interface 101 receives the data packets from the data stream on the input line 116 and forwards the received data packets, or simply packets, preferably in parallel, on lines 118 to both the stream identifier 102 and the queue memory manager 114. The input interface 101 should have functionality which is appropriate for the particular external system or device from which the packets on the data stream originate. The input interface 101 is generally not directly responsible for any processing related to the quality management of the data stream in accordance with the present invention.

The input interface 101 may have some basic functionality to perform an initial check on the packets received in the data stream. For example, if a corrupted packet is received the input interface 101 may discard the packet. The structure of the input interface 101 is implementation dependent. The basic functionality of the input interface 101 that performs any desired features will be apparent to one skilled in the art.

The queue memory manager 114 is responsible for managing a set of queues and a packet storage area. The queue memory manager 114 receives the packets from the input interface 101. On arrival of the packets, the queue memory manager 114 allocates a unique identifier to each of the packets, and sends the packet identifier for each of the packets to the stream identifier 102 on line 140. The queue memory manager 114 additionally stores the packets in a temporary packet buffer. The queue memory manager 114 also assigns a reference counter to each of the packets and initializes the reference counter for one of the packets to zero. As will be described further hereinbelow, the reference counter is used by the queue memory manager 114 to determine whether the one packet associated with the reference counter is still being processed by the multiplexor 100, or whether it should be removed from (or not initially entered into) the queue memory 112.

The packet identifier is an identifier which uniquely identifies a packet. The packet identifier uniquely identifies the packet for the purpose of storing the packet identifier in the queue memory 112 as is described further hereinbelow and distinguishing each packet from other packets in the queue memory 112. In one implementation, the packet identifier is a number and each packet may be allocated a packet identifier that is the next number in a sequence. Alternatively, the packet identifier may be composed of unique information from a packet header. In systems in which size of the packet is variable, the length of the packet may be included in the packet identifier.

The stream identifier 102 also receives the packets from the input interface 101 on lines 118, and receives the packet identifier for each packet on line 140 from the queue memory manager 114. The stream identifier 102 is responsible for determining which data stream each of the packets belong. Thus, for example, the stream identifier 102 will determine whether a particular packet is associated with a VoIP stream, a block data transfer stream, or a telnet traffic stream. In accordance with the data stream to which the particular received packet identifier belongs, the stream identifier 102 forwards the packet identifier for that packet to one of the policer/shapers 104 for further processing.

As will become apparent from the following description, the remainder of the processing is based on the packet identifier and not the packet. The packet identifier advantageously provides an efficient representation of the packet. As will be described hereinafter, the queue memory 112 and the packet identifiers ensure that the original sequence position of each individual packet is not lost in the multiplexing operation.

Policer/shapers 104 are an operational variant of a First-In, First-Out (FIFO) queue, in which there is subsidiary processing associated with the insertion and removal of elements from the queue. Such FIFO queues are well-known, and their implementation will be well within the scope of a person skilled in the art. The configuration of the policer/shapers 104 is implementation dependent.

In FIG. 1, one policer/shaper 104 may be allocated to each of the different types of data streams being received. Thus, for example, the policer/shaper 104a may be allocated to a VoIP stream, the policer/shaper 104b may be allocated to a block data transfer stream, and the policer/shaper 104c may be allocated to a telnet traffic stream. The policer/shaper 104d, coupled to input line 120d and output line 122d, is shown in FIG. 1 by way of illustrating a means for managing packets associated with streams other than those processed by the policer/shapers 104a, 104b, 104c. Thus the stream identifier 102 forwards packet identifiers associated with VoIP packets on input line 120a to the policer/shaper 104a, forwards packet identifiers associated with block data transfer packets on input line 120b to the policer/shaper 104b, and forwards packet identifiers associated with telnet traffic packets on input line 120c to the policer/shaper 104c.

In the case of multi-casting or other services implementing replication (e.g., monitoring), the stream identifier 102 may forward packet identifiers to more than one policer/shaper 104. Additionally, the stream identifier 102 does not forward packets for further processing within the multiplexor 100. Rather, the stream identifier 102 forwards the packet identifiers allocated to packets for further processing in the multiplexor 100.

The policer/shapers 104 are responsible for the assignment of quality classifications to the packets within the data stream, and responsible for the quality control of the data stream in both the short term and the long term by selectively discarding packet identifiers in the data stream and selectively time-shifting packets in the data stream. One function of the policer/shapers 104 is to service packets, using the corresponding packet identifiers, with a variable service rate. As a result, the packet identifiers leaving the policer/shapers 104 are variably spaced, preferably with a random or pseudo-random spacing. Spacing the packet identifiers randomly ensures that the least urgent traffic is eventually serviced by the cherish/urgency multiplexor 106. The variable spacing of the packets at output lines 122a, 122b, 122c, 122d, (which are collectively referred to as output lines 122) of the policer/shapers 104 reduces the coherence between streams from independent sources. Creating independent temporal patterns between streams increases fairness of the cherish/urgency multiplexor 106 decision processes. Cherish/urgency classifications allocated to the packet identifiers in the policer/shapers 104 do not on their own ensure fairness unconditionally.

For example, the delay experienced by a packet with an associated low urgency level depends on the temporal pattern of more urgent traffic streams. If two streams with different cherish/urgency levels are temporarily coherent, the more cherished packets may always "win" the race to enter the cherish/urgency multiplexor 106 and/or the more urgent data may always be transmitted first. This becomes statistically less likely if the streams have variably spaced packets.

Figure 4:
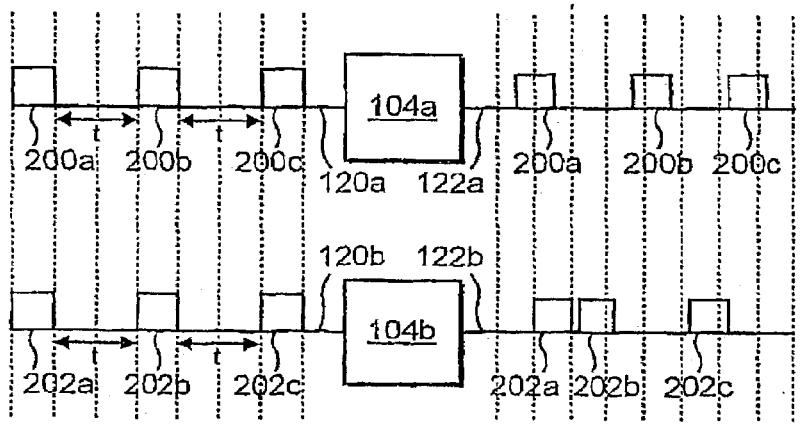
FIG. 4 illustrates a diagram representing stochastically servicing packets in accordance with the principles of the invention.

Referring now to FIG. 4, illustrated is a diagram representing stochastically servicing packets in accordance with the principles of the present invention. FIG. 4 illustrates the policer/shapers 104a, 104b, of FIG. 1 with examples of the data streams on the input lines 120a, 120b, and the output lines 122a, 122b. The policer/shaper 104a receives packet identifiers 200a, 200b, 200c, at a constant spacing "t" on the input line 120a. The policer/shaper 104b receives packet identifiers 202a, 202b, 202c, at a constant spacing "t" on the input line 120b. The policer/shaper 104a services the packet identifiers in its queue such that the packets identifiers 200a, 200b, 200c, are generated on the output line 122a with variable spacing therebetween. Similarly, the servicing of packet identifiers 202a, 202b, 202c, by the policer/shaper 104b results in packets identifiers 202a, 202b, 202c, on the output line 122b having variable spacing.

A second function of the policer/shapers 104 is to limit the volume of traffic on a data stream which may be achieved by the selective discard of packets. The nature of the policing policy is specified in terms of a load profile, which is a function of (at least) the offered load (i.e., an arrival rate of packets on a data stream). Therefore, and advantageously, there can be different characteristics defined for various load levels. That is, quality can be down-graded or up-graded as the arrival rate increases. Transport characteristics can, therefore, be configured to better match the application requirements and to avoid effects of an abnormal offered load (e.g., denial of service attacks).

Figure 7:
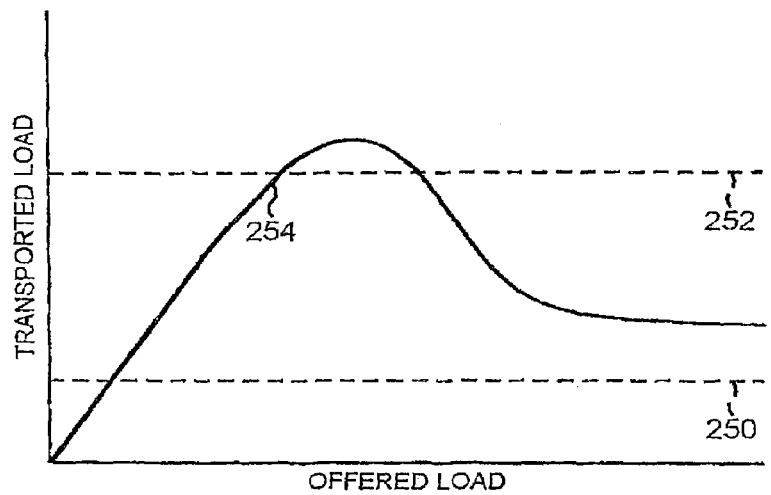
FIG. 7 illustrates a diagram defining a transported load as a function of an offered load in accordance with the principles of the present invention.

Referring to FIG. 7, the principle of defining transport characteristics (e.g., transport loads) in terms of an offered load is illustrated. In FIG. 7, the x-axis illustrates the offered load and the y-axis illustrates a load which is actually transported. As can be seen in FIG. 7, there are two threshold levels, namely, a lower threshold level 250 and an upper threshold level 252. If the offered load does not exceed the upper threshold level 252, then the offered load can be transported within configured boundaries. If the offered load exceeds the upper threshold level 252, then the offered load cannot be guaranteed to be transmitted. The lower threshold level 250 represents the minimum transported load regardless of how high the offered load becomes.

Thus, once the offered load reaches the upper threshold level 252 and point 254, the transported load is adjusted such that it is reduced. As the offered load increases, the transported load continues to reduce to the point where it steadies out and tends towards the lower threshold level 250.

Thus, the rate of packet discard may be determined by the offered load. The upper threshold level 252 defines a level at which the selective discard of packets is triggered. Packets are preferably discarded based on an instantaneous approximation of the offered load. Packets may be discarded probabilistically based on an instantaneous approximation of the offered load. If the offered load results in a transported load exceeding the upper threshold level 252, the transported load is reduced below the upper threshold level 252 by selectively discarding packets.

When reduced, the transported load is preferably reduced to a level above the lower threshold level 250. The reduction in the transported load is greater, the larger the offered load. The transported load is further reduced responsive to an increase in the offered load.

Figure 10:
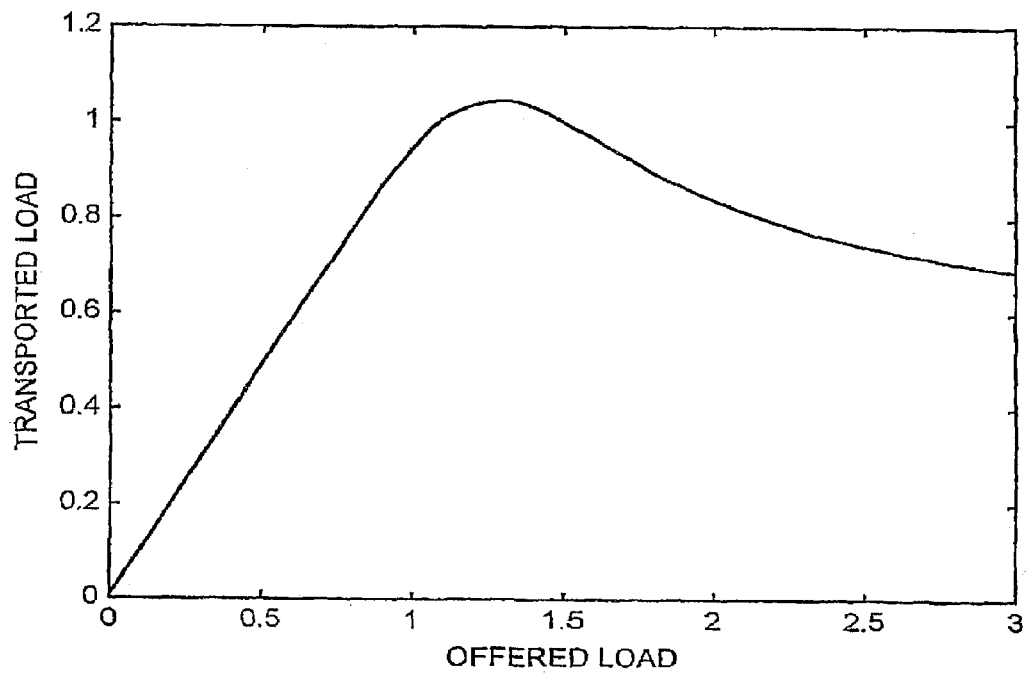
FIG. 10 illustrates a graph representing a load profile for a policer/shaper implementation in accordance with the principles of the present invention.

A policer/shaper, such as the policer/shapers 104, achieves a desired load profile by a selective discard of packets. Packets are preferably discarded based on an instantaneous approximation of the offered load. Referring to FIG. 10, illustrated is a graph representing a load profile for a policer/shaper implementation in accordance with the principles of the present invention. FIG. 10 illustrates a load profile for an exemplary policer/shaper implementated as a queue with 10 buffers and stochastic service times sampled from an exponential distribution whose rate parameter is dependent on the number of packets queuing. Service rate parameters, e.g., $\mu_1 = \mu_2 = \ldots = \mu_9 = 1.3234$, $\mu_{10} = 0.5$, represent the numeric values for the service rates and the offered and transported loads are scaled so that the upper threshold level takes the value 1. A description of such an implementation is provided in an example hereinafter. The load profile illustrated in FIG. 10 depicts the average transported load when the arriving traffic has a Poisson pattern. The results associated with application of standard queuing theory permit the determination of the expected loss rate.

Returning now to FIG. 1, a third function of the policer/shapers 104 is to allocate cherish and urgency classifications to the packet identifiers included in their queues. By allocating such classifications to the packet identifiers, the packets themselves are inherently allocated the same classification. The principle of cherish and urgency levels is discussed in International Patent Application No. PCT/GB00/01569. A cherish level indicates a class or level of loss for a packet. The class of loss indicates the tendency of the packet to be discarded. An urgency level indicates the level of urgency by which a packet should be processed. The urgency and cherish levels can, in combination, be considered to constitute a priority level for a packet. Thus, a priority level, for example, has two components in this context.

As discussed hereinabove, in the policer/shaper 104, transport characteristics for a stream, including allocation of cherish and urgency levels, are determined based on the offered load. The cherish and urgency classifications are advantageously assigned simultaneously to packet identifiers based on a function of the current state of the queue when the classification is being calculated. The likelihood of being in a particular state is a function of the offered load. This classification function is configurable, and can be chosen without constraint. For example, a given policer/shaper may be configured to assign one of two classifications to packets based on a probabilistic choice. The classification probability used may be related to the length of the queue. That is, such a configuration may be designed to allocate higher classifications to packets with a higher probability when the offered load is low.

The classification of a packet determines, for instance, the maximum loss and delay it will most likely experience when it is multiplexed with other streams at the output of the policer/shapers 104, as will be described further hereinbelow. This is a separate concept to that of the loss and delay the packet may experience inside the policer/shapers 104. The loss experienced by a packet in the policer/shapers 104 depends on the recent arrival rate of the stream and the length of the queue. The delay is determined by the configured service rates and the length of the queue.

Each of the policer/shapers 104 is preferably embodied using a queue with a variable service rate. When a policer/shaper 104 receives a packet identifier, it determines whether the packet identifier should be stored in its internal queue or discarded. The control of the admission of a packet identifier into a policer/shaper queue is discussed further hereinbelow.

Figure 2:
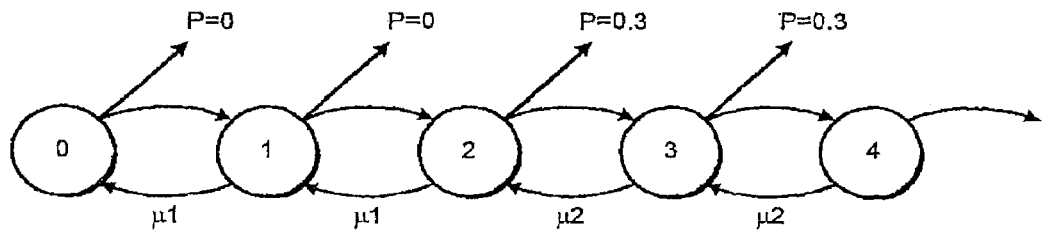
FIG. 2 illustrates a diagram representing queuing in accordance with the principles of the invention.

In the following, the operation by which packets are admitted to or discarded from the policer/shapers 104 is first discussed. For the purposes of this discussion, an example is taken of a policer/shaper utilizing a queuing system having a queue length of four as illustrated in FIG. 2. Each state in FIG. 2 is labelled with the length of the queue in that state. The service times in each state are obtained by sampling an exponential distribution with rate parameter "$\mu$". The service times determine the conceptual rate of service for the packet. Two different service rates are used in the example shown in FIG. 2. If the queue is in state 1 (i.e., the queue has only one packet) then "$\mu_1$" determines the rate of service for the packet at the head of the queue. If the queue is longer, for example in state 3, service rate "$\mu_2$" would be used.

This example embodiment of the policer/shapers 104 also has arbitrary discard probabilities associated with each state. That is, on arrival, there is a probability that the packet identifier will be arbitrarily discarded. In this example, the probability of this event depends on the state of the queue when the packet identifier arrives. The operation of the policer/shapers 104 is now described in terms of the state of the queue on arrival of the packet identifier.

In a first case, it is assumed that the queue is full at the time the packet identifier arrives. In such a case, the probability of the packet identifier being entered into the queue is zero. This does not necessarily mean that the packet is automatically discarded, as the packet may have been sent to more than one of the available policer/shapers 104. In such a case, the policer/shaper 104 forwards a command on its respective line 138a, 138b, 138c, 138d, (which are collectively referred to as line 138), to decrement the reference count for the packet associated with a particular identifier. The queue memory manager 114 then will discard the packet referenced by the packet identifier if its reference count is 0 or less.

In a second case, at the time of arrival of a packet identifier at the policer/shapers 104 the queue is nearly full. For example, suppose the queue is in state 3. In state 3, there is a 30% chance that the packet identifier will not be entered into the queue. If the packet identifier is admitted, then it is stored in the queue of the policer/shaper and the queue moves to state 4. The queue is then full, and any packet identifiers arriving before a packet identifier in the queue departs will not be admitted.

If the packet identifier is entered into the queue of the policer/shapers 104, the policer/shapers 104 send an appropriate signal on its respective line 138 to the queue memory manager 114 indicating that the packet associated with the packet identifier is to be admitted into the queue memory 112 and stored in a specific queue allocated for packets belonging to this stream.

When a departure is scheduled, the packet identifier at the head of the queue is serviced. The sampled rate used to service this packet identifier depends on the state of the queue. On the basis that the queue is in state 4, the sample service rate used to service this packet identifier is determined by an exponentially distributed random variable with mean "$\mu_2$". The calculated service time of this packet is based on the sample service rate and the length of the packet.

In a third case, a packet identifier arrives at a time when the queue is nearly empty. The processing of the packet identifier in this case is very similar to the case when the queue is nearly full. Suppose a packet identifier arrives when the queue is in state 1. There is little chance of the packet being arbitrarily discarded, since the probability of this event is configured to be zero. Therefore, the packet identifier is stored in the queue, and the queue moves to state 2. If a departure event is scheduled before another arrival occurs, the packet identifier at the head of the queue is serviced based on the service rate for state 2 which is "$\mu_1$". In a fourth case, the packet identifier arrives at a time when the queue is empty. In this case, as in the third case, the packet identifier will be admitted to the queue.

The description contained hereinabove has assumed that the policer/shapers 104 are not configured to send any packets without delay. In other words, the policer/shapers 104 preferably have no low load transparency, all packets being delayed. In its simplest form, low load transparency allows the first packet arriving at an empty queue to be forwarded immediately. Notwithstanding this action, the queue moves into state 1. Subsequent packets arriving are processed as though this packet is present, except that when this packet would normally have been forwarded on expiration of its timer, it is not sent. Whether or not a packet identifier has been forwarded immediately on arrival or not is recorded in the queue. This concept can similarly be extended to multiple packets.

Before a packet identifier leaves the policer/shapers 104, the policer/shapers 104 determines a quality classification for that packet identifier. The policer/shapers 104 classify the packet identifiers, as described hereinabove, with cherish and urgency classifications. Each packet identifier should be classified with a cherish and urgency classification before it is forwarded to the cherish/urgency multiplexor 106. The classification assigned to a packet identifier is a function of the current state of the queue.

Again, assuming the policer/shapers 104 have a queue of length 4. As shown in FIG. 2, it is assumed that the queue of the policer/shapers 104 is configured such that the service rates for states 1 and 2 are defined as $\mu_1$, and the arbitrary loss possibility for states 1 and 2 is zero. States 3 and 4 have a defined service rate of $\mu_2$, and have an arbitrary loss probability of 0.3 (i.e., 30%).

Figure 3:
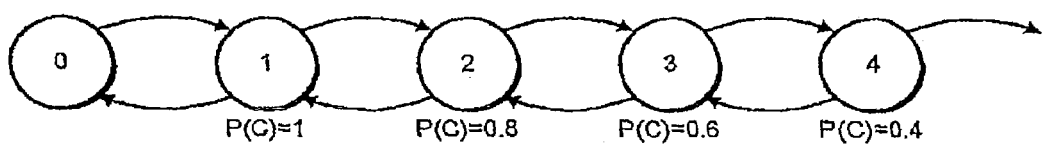
FIG. 3 illustrates a diagram representing allocating priority levels in accordance with the principles of the invention.

In a preferred embodiment, the policer/shapers 104 are configured with a primary and a secondary cherish/urgency classification and a packet identifier is assigned one of the classifications upon arrival. Each state has an associated probability of a packet being classified with the primary classification. The probability of classifying a packet with the primary classification in each state is, in this example, configured to be: for state 1, 100%; for state 2, 80%; for state 3, 60%; and for state 4, 40%. These probabilities are illustrated in FIG. 3.

For example, the primary classification may be a more desirable classification than the secondary classification. If the offered load on the stream is low, the packets have a higher probability of being assigned the more desirable primary classification, as the queue will most often be in state 1 or 2. As the offered load increases, there is a higher probability that a packet identifier will be assigned the secondary classification, which is less desirable, as this could mean the packet identifier will experience more delay and/or loss in the cherish/urgency multiplexor 106.

Referring to the discussion hereinabove of the criteria for admitting a packet identifier to the queue, when a packet identifier is admitted to the queue in case 2 (i.e., in the example when the queue is in state 3 and the packet identifier is admitted, moving the queue to state 4) the probability of classifying the packet identifier with the primary classification is 40% as the queue is then in state 4. Therefore, there is a 40% chance that the packet identifier will be assigned the primary classification, and a 60% chance that it will be assigned the secondary classification. This classification of the packet identifier is based on a simple probabilistic choice.

A packet identifier is then emitted from the policer/shapers 104 queue at the end of the calculated service time, and the queue moves to state 3. A new calculated service time based on the defined parameters of state 3 then determines when the next departure is performed. If an arrival occurs before this period of time expires, the queue may then move to state 4 again, based on whether the arrival is arbitrarily discarded or not.

Referring to case 3 above, in the case where a packet identifier arrives when the queue is nearly empty, the packet identifier is classified using the probability associated with state 2. In this case, there is an 80% chance of the packet identifier being sent to the cherish/urgency multiplexor 106 with the primary classification.

Arbitrarily discarding packets on their arrival at the policer/shapers 104 not only reduces the arrival rate of the stream, but also helps to avoid burst loss. For example, if a burst of six packets arrived in the queuing system of FIG. 2, the last two packets would be lost if packets were not arbitrarily discarded. On the other hand, if the probability of arbitrary discard increases with the queue length, it may be the case that, for example, the fourth or third packet is discarded on arrival, thus distributing the loss in the burst more fairly.

Another function of the policer/shapers 104 as described hereinabove, is to keep the packet associated with the packet identifier being processed in the queue memory 112 by interacting with the queue memory manager 114. Storing packets in queues is preferable to ensure that packets in a stream are not re-ordered by the service process of the cherish/urgency multiplexor 106. Depending on the function chosen to assign cherish/urgency levels to packets, there is the possibility the packets could be re-ordered during the multiplexing onto line 124, as discussed further hereinafter.

As an example, consider the simple probabilistic classification function described above. Assume a burst of four packet identifiers arrive in one of the policer/shapers 104 and all packets are stored in the queue. Furthermore, assume no more arrivals occur during the first period in question. Furthermore again, assume that the cherish/urgency multiplexor 106 is not empty, with packets originating from other of the policer/shapers 104. Finally, assume that the primary cherish/urgency classification has a desirable high urgency level, while the secondary classification has a low urgency level. Given these conditions, the packet identifier at the start of the burst, referred to as "packet identifier 1" has a higher probability of being assigned the secondary cherish/urgency classification then a packet near to the end of the burst, called "packet identifier 4." If packet identifier 1 is assigned the secondary classification, while packet identifier 4 is assigned the primary classification, the difference in urgency levels may cause packet identifier 4 to be serviced before packet identifier 1 in the cherish/urgency multiplexor 106.

In order to avoid this, the policer/shapers 104 instruct the queue memory manager 114 to queue packets in the queue memory 112 according to the order in which the corresponding packet identifiers are received in the policer/shapers 104. That is, on arrival in the policer/shapers 104, if a packet identifier is not discarded, the queue memory 112 is instructed to queue the packet in the queue of the relevant stream in the order in which it arrived.

Figure 8:
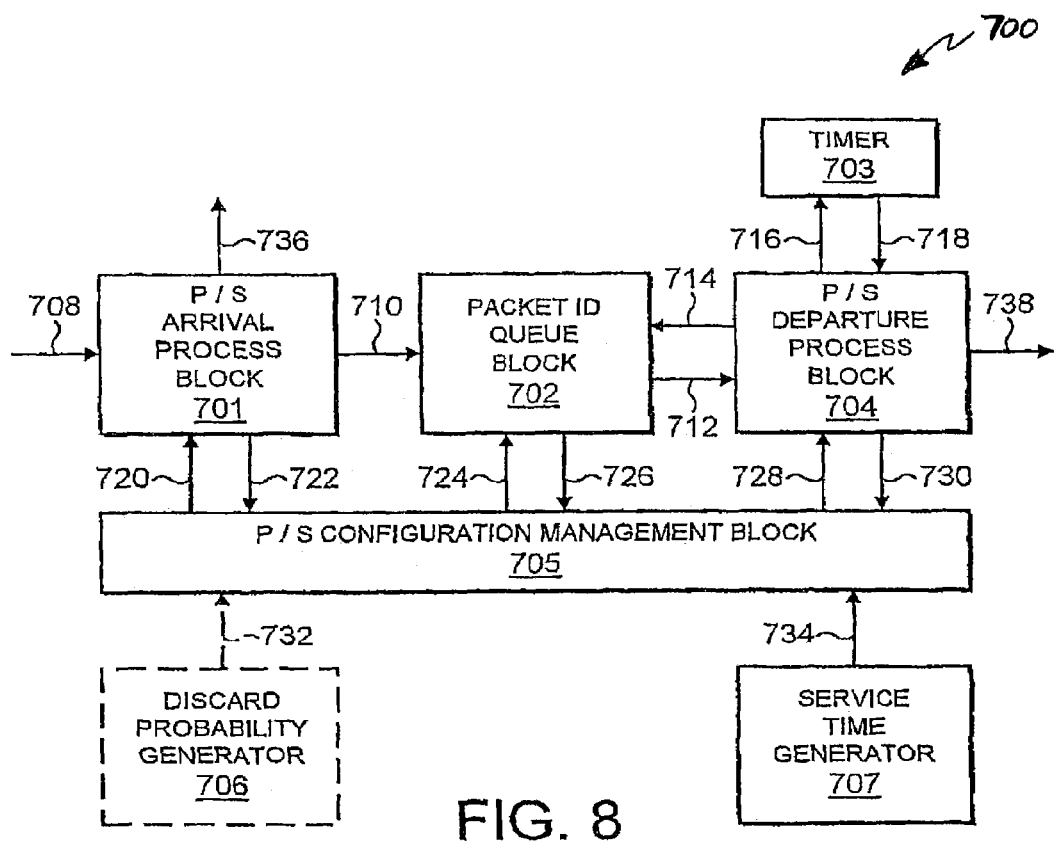
FIG. 8 illustrates a block diagram of an embodiment of a policer/shaper constructed in accordance with the principles of the present invention.

FIG. 8 illustrates a block diagram of an embodiment of a policer/shaper, generally designated 700, constructed in accordance with the principles of the present invention. The policer/shaper 700 includes a policer/shaper arrival process block 701, a packet identifier queue block 702, a timer 703, a policer/shaper departure process block 704, a policer/shaper configuration management block 705, a discard probability generator 706, and a service time generator 707.

Packet identifiers arrive via line 708 to the policer/shaper arrival process block 701. The policer/shaper arrival process block 701 notifies the policer/shaper configuration management block 705 via line 720 that a packet identifier has arrived. The policer/shaper configuration management block 705 polls the packet identifier queue block 702 via line 724 to obtain the current length of the queue within the policer/shaper 700. Based on the response from the packet identifier queue block 702 via line 726, the policer/shaper configuration management block 705 determines if the queue is full or not. If there is available capacity in the queue, the policer/shaper configuration management block 705 then determines whether or not the packet identifier should be arbitrarily discarded, using input from the discard probability generator 706 on line 732.

If the packet identifier is to be admitted to the queue, the policer/shaper configuration management block 705 alerts the policer/shaper arrival process block 701 via line 722 to admit the packet identifier. On receipt of this response, the policer/shaper arrival process block 701 sends a request via line 736 (equivalent to one of lines 138) to a queue memory manager 114 to enqueue the packet in the one queue in the queue memory 112 which is allocated for this stream. The policer/shaper arrival process block 701 then forwards the packet identifier to the packet identifier queue block 702 via line 710. The policer/shaper configuration management block 705 calculates a new service time, based on input from the service time generator 707 on line 734 and the length of the packet, and sends this service time to the policer/shaper departure process block 704 via line 728. The policer/shaper departure process forwards the new service time to the timer 703 via line 716. The timer 703 resets itself to wake up at the end of the new service time.

If the policer/shaper configuration management block 705 determines that the queue is full, it instructs the policer/shaper arrival process block 701 via line 722 to discard the packet identifier. In this case, the policer/shaper arrival process block 701 sends a discard instruction to the queue memory manager 114 via line 736. The policer/shaper arrival process block 701 then discards the packet identifier.

When the timer 703 wakes up, it sends a request via line 718 to the policer/shaper departure process block 704 to emit a packet identifier. The policer/shaper departure process block 704 sends a request to the policer/shaper configuration management block 705 via line 730 for a classification and a new service time. The policer/shaper configuration management block 705 polls the policer/shaper packet identifier queue block 702 via lines 724 and 726 to obtain the queue's current length. The policer/shaper configuration management block 705 uses the current length of the queue to determine the classification for the packet identifier which is about to be emitted. The classification is sent to the policer/shaper departure process block 704 via line 728. The policer/shaper departure process block 704 concatenates a queue identifier, specifying which queue in the queue memory 112 is used for storing packets of this data stream, and the classification to the packet identifier and forwards this tuple of data on line 738.

It should be noted that in this example implementation the classification of the packet identifiers is carried out as the packets leave the queue. The point at which the packets are classified within the policer/shapers 104 is, however, implementation dependent, and is not limited to the example given herein. As described hereinabove, the packet identifiers may be classified on arrival rather than on departure.

If the queue identified in the packet identifier queue block 702 is non-empty, the policer/shaper configuration management block 705 also sends a new service time to the policer/shaper departure process block 704 via line 728. This service time is forwarded to the timer 703 via line 716, and the timer 703 sets itself to wake up after this time. If the queue is empty, no action is taken.

Figure 6:
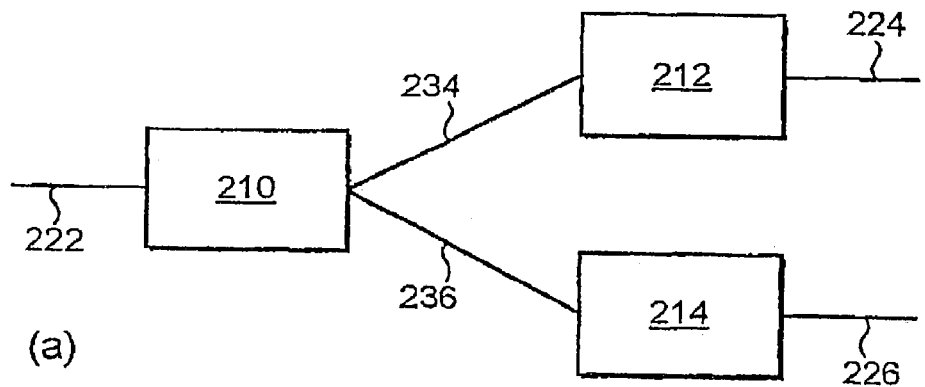
FIGS. 6(a) and 6(b) illustrate a block diagram of an embodiment of cascading policer/shapers constructed in accordance with the principles of the invention.
Figure 6:
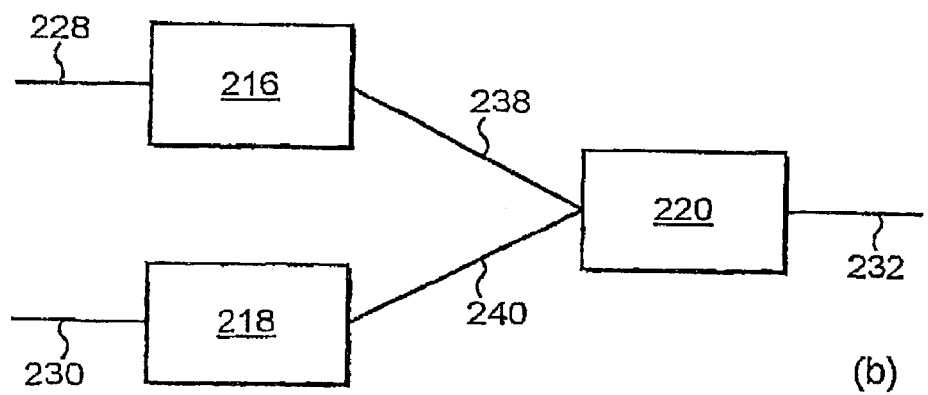

Further possible modifications to the policer/shapers 104 shown in FIG. 1 are illustrated with reference to FIG. 6. As shown in FIG. 6, the policer/shapers 104 may be cascaded in various ways.

Referring to FIG. 6(a), there is illustrated an advantageous arrangement in which the output of a policer/shaper 210 provides an input to two parallel policer/shapers 212, 214. The policer/shaper 210 receives packet identifiers on line 222 from the stream identifier 102. In accordance with the standard operation of the policer/shapers 104, the policer/shaper 210 selectively discards packet identifiers and time-shifts packet identifiers to provide a modified flow of packet identifiers on its output. In a first embodiment, the modified flow of packet identifiers is broadcast on lines 234 and 236 to each of the parallel policer/shapers 212, 214. The respective policer/shapers 212, 214 then selectively discard packet identifiers and time-shift packet identifiers to generate two further modified packet identifier flows on their outputs 224 and 226. In a second embodiment, the output of the policer/shaper 210 is selectively provided to either one or the other of the policer/shapers 212 and 214. The appropriate one of the policer/shapers 212, 214 then selectively discards packet identifiers and time-shifts packet identifiers onto its respective output.

Referring to FIG. 6(b), there is illustrated a further arrangement in which two parallel policer/shapers 216, 218 receive inputs including packet identifiers on flows on lines 228 and 230. The output of both policer/shapers 216, 218 on their respective outputs 238 and 240 form an input to a further policer/shaper 220. The policer/shaper 220 outputs packet identifiers on line 232.

It will be apparent to the person skilled in the art how policer/shapers can be cascaded in various combinations of the arrangements shown in FIG. 6. For example, the arrangements of FIGS. 6(a) and 6(b) may be cascaded. In addition, any one of the policer/shapers may also receive inputs from other sources. For example, the policer/shaper 212 of FIG. 6(a) may receive an additional input which is not derived from another policer/shaper. One skilled in the art will appreciate how various cascading arrangements may be implemented. The only constraint is that the cascaded policer/shapers should be connected in an acyclic graph.

On departure, the policer/shaper sends both the packet identifier, and its associated queue identifier and classification to the cherish/urgency multiplexor 106 via a respective output line 122. The cherish/urgency multiplexor 106 employs the packet identifier in addition to the queue identifier in case it has to issue a discard instruction to the queue memory manager 114, as will be discussed in further detail hereinbelow.

The cherish/urgency multiplexor 106 manages the contention for the network resources between two or more streams. The cherish/urgency multiplexor 106 receives packet identifiers from the various policer/shapers 104, each packet identifier being tagged with a cherish/urgency classification.

The classification of a packet identifier defines a cherish level and an urgency level for the packet with which it is associated. The cherish/urgency multiplexor 106 manages the contention between two or more streams by servicing packets (via their packet identifiers) depending on their urgency level and, when necessary, discarding packets depending on their cherish level. The cherish level determines which packets are entered into the cherish/urgency multiplexor 106. The urgency level determines the order in which the packets are taken from the cherish/urgency multiplexor 106. Classifying packets using cherish and urgency levels is described in International Patent Application No. PCT/GB00/01569. Thus the cherish/urgency mulitplexor 106 manages the contention between the three streams on the output lines 122a, 122b and 122c at the outputs of the policer/shapers 104a, 104b and 104c.

When a packet identifier with its associated cherish/urgency classification arrives, the cherish/urgency multiplexor 106 determines whether the packet identifier should be stored or discarded. This is determined by the available storage capacity in the cherish/urgency multiplexor 106 and the cherish level associated with the identifier.

In one known method of implementing cherishing, access to a buffer in the cherish/urgency multiplexor 106 is determined by associating a cherish level with a particular area of the buffer. That is, suppose a packet can be classified with any one of "N" cherish levels. Then, assume there are "$K_N$" buffers in total. Traffic of cherish level 1 can enter any of the "$K_N$" buffers, while traffic of cherish level "i" can only enter the first $K_{N-i+1}$ buffers, where $K_0=0<K_1<\ldots<K_N$. Therefore, packets of cherish level 1 will have greater probability of finding available buffer resources than packets of cherish level "i," where i>1.

A scheme is also necessary to determine which packet identifier to forward, that is, how the urgency levels should be used to determine the order in which packets are serviced. One approach is to forward the identifier at the head of the queue with the highest urgency level, although other approaches are possible. The loss rate for packet identifiers in a given stream is determined both by the cherish level assigned to the packets and by the maximum arrival rate for all other streams which have a cherish level of equal or greater value. The order in which packets are serviced in the cherish/urgency multiplexor 106 depends on their urgency levels and the arrival rates and patterns of more urgent traffic. This determines the delay experienced by the packet identifier in the cherish/urgency multiplexor 106.

If the cherish/urgency multiplexor 106 discards a packet identifier it instructs the queue memory manager 114 via line 136 to decrement the reference count for the appropriate packet from the queue memory 112. The cherish/urgency multiplexor 106 records statistics about the traffic flows, including but not limited to, the number of the bytes and/or the number of packets both accepted and rejected for each urgency level and each cherish level.

The cherish/urgency multiplexor 106 forwards one of the stored packet identifiers along with its associated queue identifier from its internal buffers to the rate limiter 108 on line 124 responsive to a request from the rate limiter 108 on line 126. The choice of which identifier pair is forwarded to the rate limiter 108 responsive to a request therefrom is determined by the packet identifier's urgency level and the selection mechanism of the cherish/urgency multiplexor 106.

Figure 9:
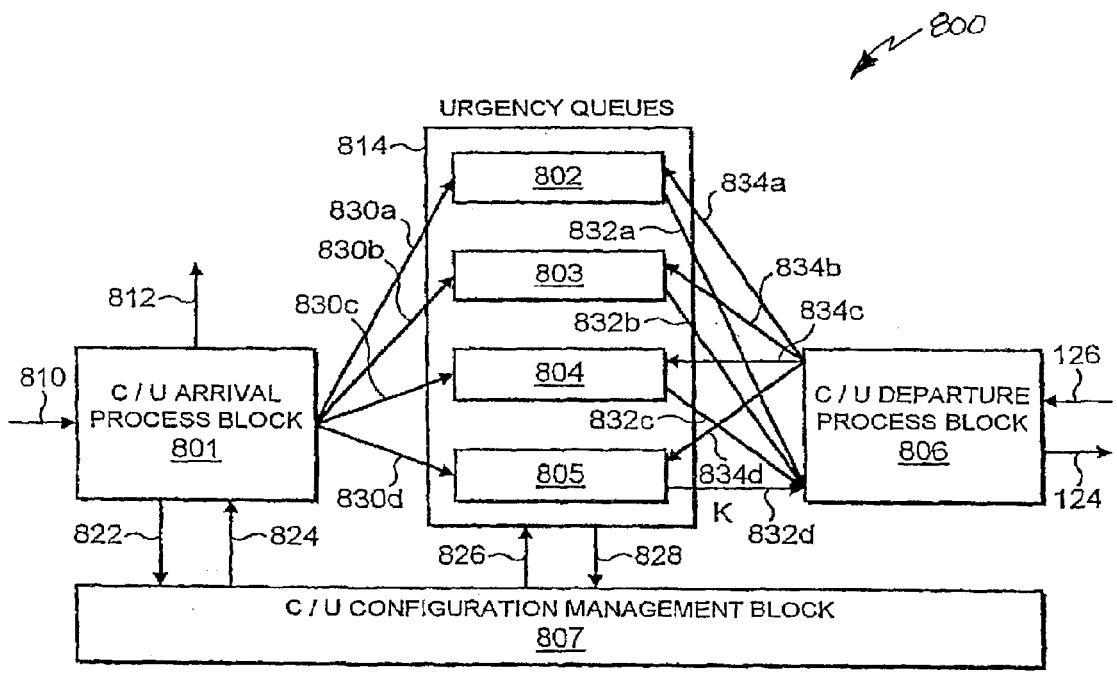
FIG. 9 illustrates a block diagram of an embodiment of a cherish/urgency multiplexor constructed in accordance with the principles of the present invention.

Turning now to FIG. 9, illustrated is a block diagram of an embodiment of a cherish/urgency multiplexor, generally designated 800, constructed in accordance with the principles of the present invention. The cherish/urgency multiplexor 800 includes a cherish/urgency arrival process block 801, a set of urgency queues 814 comprising queues 802-805, a cherish/urgency departure process block 806, and a cherish/urgency configuration management block 807.

Packet identifiers arrive via line 810 to the cherish/urgency arrival process block 801. The cherish/urgency arrival process block 801 notifies the cherish/urgency configuration management block 807 that a packet identifier has arrived and forwards its cherish level via line 822. The cherish/urgency configuration management block 807 requests the length of each one of the urgency queues 802-805 via line 826. Based on the current total number of packet identifiers queueing in the cherish/urgency multiplexor 800 and the cherish level of the packet identifier, the cherish/urgency configuration management block 807 determines whether or not to discard the packet.

If the packet identifier is to be discarded, the cherish/urgency configuration management block 807 notifies the cherish/urgency arrival process block 801 accordingly via line 824. In this case, the cherish/urgency arrival process block 801 sends an instruction to discard the packet to the queue memory 112 via line 812, identifying the packet to discard by its packet identifier and its queue identifier. These identifiers are then discarded by the cherish/urgency arrival process block 801.

Otherwise, the cherish/urgency configuration management block 807 notifies the cherish/urgency arrival process block 801 via line 722 to forward the packet identifier to one of the urgency queues 802-805. There is one of the urgency queues 802-805 for each urgency level. This example implementation illustrates a cherish/urgency multiplexor 800 configured for four possible urgency levels. The cherish/urgency arrival process block 801 obtains the urgency level for the packet identifier and forwards the packet identifier and its associated queue identifier via one of the lines 830 to the appropriate one of the urgency queues 802-805.

Requests for packets from the rate limiter 108 are received by the cherish/urgency departure process block 806 via line 818. When a packet request arrives, the cherish/urgency departure process block 806 requests the head element of one of the urgency queues 802-805 via one of the lines 834. In the preferred embodiment, the identifiers at the head of the most urgent of the urgency queues 802-805 will be requested. The packet identifier and queue identifier pair at the head of the queue which has received the request are forwarded to the cherish/urgency departure process block 806 via one of the lines 832. The cherish/urgency departure process block 806 forwards the pair of identifiers immediately to the rate limiter 108 via line 124.

The rate limiter 108 moves contention from a point downstream in the network to within the multiplexor 100 by restricting the service rate to one for which the network has sufficient resources. The rate limiter 108 ensures that the maximum service rate is not exceeded in the long term by assuring that appropriate gaps are maintained between transmitted packets.

The rate limiter 108 requests packet identifiers from the cherish/urgency multiplexor 106 on a request line 126, and receives packet identifiers along with their associated queue identifiers on line 124. On receiving the pair of identifiers on line 124, the rate limiter 108 provides the queue identifier on line 134 to the queue memory manager 114. Responsive thereto, the queue memory manager 114 provides the packet at the head of the identified queue from the queue memory 112 to the rate limiter 108 on line 132. The rate limiter 108 then forwards packets for transmission to the output interface 110 on line 128. On forwarding a packet to the output interface 110, the rate limiter 108 sets a timer to represent the service time of the particular packet at the configured rate. At the end of the timing period assigned to the servicing of the particular packet, the rate limiter 108 requests a further packet on line 126 from the cherish/urgency multiplexor 106.

If no re-ordering has occurred in the cherish/urgency multiplexor 106, the packet sent from the queue memory manager 114 will be the same packet identified by the packet identifier. Otherwise, the packet identifier received by the rate limiter 108 will refer to a packet which is still waiting in the queue in the queue memory 112.

The rate limiter 108 can service packets stochastically or deterministically. The rate limiter 108 may thus service packets such that they have variable spacing, as discussed hereinabove with reference to the policer/shapers 104.

A unit can be made from combining a cherish/urgency multiplexor 106 and rate limiter 108, preferably one which services packets stochastically. Such units can be cascaded with a plurality of policer/shapers and other such cherish/urgency multiplexor and rate limiter units and may receive additional inputs from other sources. One skilled in the art will appreciate how various cascading arrangements may be implemented. The only constraint is that the cascaded combination of these units should be connected in an acyclic graph.

Figure 5:
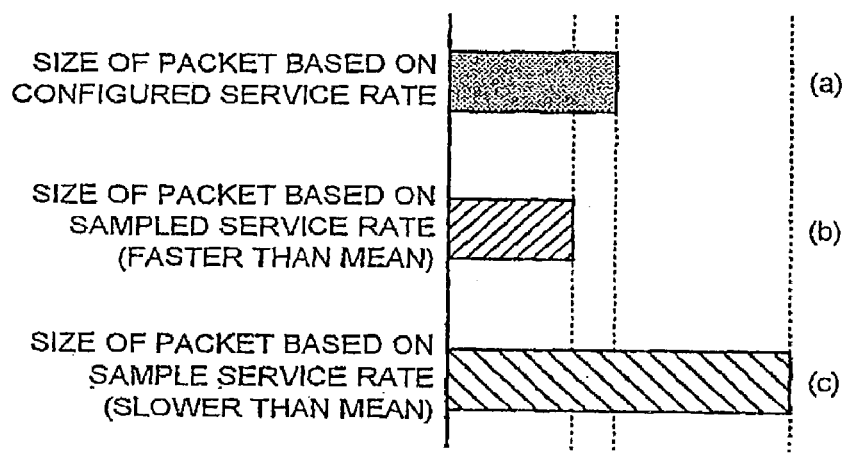
FIGS. 5(a), 5(b) and 5(c) illustrate diagrams representing conceptual packet length in accordance with the principles of the invention.

If stochastic service rates are used, there is the potential that the sampled service rate may be much faster than the rate at which the packet can be physically transmitted by the output interface. In this case, the calculated resource size of the packet will be smaller than the size of the packet as illustrated in FIG. 5. Referring to FIG. 5a, there is illustrated the size of the packet, according to the physical transmission rate of the transmission medium to which it will be forwarded. FIG. 5b illustrates the size of the packet where the service rate chosen for the packet is greater than the rate at which the packet will actually be transmitted on the physical medium. FIG. 5c illustrates the size of the packet in the case where the service rate chosen for the packet is smaller than the rate at which the packet will actually be transmitted by the output interface 110.

As can be seen from FIG. 5, if the calculated resource size is actually smaller than the actual resource size of the packet, two packets may overlap. In a practical system two packets should not overlap during transmission. Instead, a burst of two or more packets will be observed. Therefore, when the packet identifiers are serviced stochastically, there is a finite probability that two or more packets will be sent back-to-back.

The output interface 110 provides flow control feedback on line 130 to the rate limiter 108. If the output interface 110 indicates to the rate limiter 108 that transmission has been suspended, the internal timing mechanism of the rate limiter 108 is affected. In this case, the rate limiter 108 can perform one of several actions. For example, the rate limiter 108 may be configured to discard any packet which is scheduled for servicing during the suspension period. Such discarding of packets by the rate limiter 108 causes the rate limiter 108 to generate an alarm signal.

The rate limiter 108 can also be improved in an attempt to maximize the resource of the external system at a low load. That is, under low loads, the service rate can be chosen which is faster then the configured rate. As the load on the system increases, the service rate will be decreased until this is near to or at the configured rate.

The output interface 110 provides the basic functionality necessary for the onward transmission of data packets. The output interface 110 provides flow control feedback on lines 130 to the rate limiter 108 when some external back pressure (for example, from the transmission medium) occurs. Thus, the output interface 110 transmits packets on line 142, and receives flow control signals on line 144 from the operating system or device driver.

The output interface 110 is responsible for little direct processing relating to the quality management of the data stream. If a packet is received by the output interface 110 and the external system or device indicates that it has available resources for transmission, then the packet is transmitted by the output interface 110 without delay. If the rate limiter 108 is operating in deterministic mode and flow control has not been exerted, there is never more than one packet in the buffer of the output interface 110 at any one time.

Thus, there has been described an invention which may be advantageously utilized in a multiplexor for providing a predetermined quality of service. Although the present invention has been described in detail, those skilled in the art should understand that they can make various changes, substitutions and alterations herein without departing from the spirit and scope of the invention in its broadest form.

What is claimed is:

1. A method of controlling an information flow in a data transmission system, comprising:
   receiving a plurality of data packets having a received physical packet length and at a received sample rate; and
   assigning a conceptual packet length for each data packet, the conceptual packet length being a service time for the packet, based on a determined service rate for each data packet.

2. The method as recited in claim 1 further comprising scheduling each data packet in accordance with a respective conceptual packet length.

3. The method as recited in claim 1 wherein the conceptual packet length for ones of the data packets is shorter than the respective received physical packet length.

4. The method as recited in claim 1 further comprising generating a modified information flow by providing a variable spacing between the data packets.

5. The method as recited in claim 1 further comprising generating a plurality of modified information flows and multiplexing the modified information flows.

6. The method as recited in claim 1 wherein the data packets are admitted to a queue based upon a length of the queue.

7. The method as recited in claim 6 wherein a level of service is associated with each data packet in the queue.

8. The method as recited in claim 1 further comprising allocating a priority level to each data packet.

9. The method as recited in claim 8 wherein the priority level includes an indication of an urgency associated with the data packet and a level of loss tolerated for the data packet.

10. The method as recited in claim 1 further comprising multiplexing adjacent data packets if a conceptual packet length of one of the adjacent data packets provides a negative spacing with the other of the adjacent data packets.

11. A controller for controlling an information flow in a data transmission system, comprising:
    input means for receiving a plurality of data packets having a received physical packet length and at a received sample rate;

means for assigning a conceptual packet length for each data packet, the conceptual packet length being a service time for the packet, based on a determined service rate for each data packet; and output means for outputting the data packet at the determined service rate.

12. The controller as recited in claim 11 further comprising means for generating a modified information flow by providing a variable spacing between the data packets.

13. The controller as recited in claim 12 wherein the means for generating a modified information flow employs one of a random pattern and a pseudo-random pattern.

14. The controller as recited in claim 11 further comprising means for allocating a priority level to each data packet.

15. The controller as recited in claim 11 further comprising means for multiplexing a plurality of information flows having data packets at a configured service rate.

16. A controller for controlling an information flow in a data transmission system, comprising:

an input interface configured to receive a plurality of data packets having a received physical packet length and at a received sample rate;

a policer/shaper configured to assign a conceptual packet length for each data packet, the conceptual packet length being a service time for the packet, based on a determined service rate for each data packet; and an output interface configured to output the data packet at the determined service rate.

17. The controller as recited in claim 16 further comprising a rate limiter configured to generate a modified information flow by providing a variable spacing between the data packets in conjunction with the policer/shaper.

18. The controller as recited in claim 17 wherein the rate limiter one of a random pattern and a pseudo-random pattern.

19. The controller as recited in claim 16 wherein the policer/shaper is configured to allocate a priority level to each data packet.

20. The controller as recited in claim 16 further comprising a cherish/urgency multiplexor configured to multiplex a plurality of information flows having data packets at a configured service rate.

* * * * *